United States Patent [19]

Tseung et al.

[11] 3,922,204

[45] Nov. 25, 1975

[54] METHOD OF MAKING CATALYST HAVING A PEROVSKITE STRUCTURE, THE RESULTING PRODUCT AND USES THEREOF

[75] Inventors: Alfred Chan Chung Tseung; Howard Lynne Bevan, both of London, England

[73] Assignee: National Research Development Corporation, London, England

[22] Filed: Apr. 19, 1971

[21] Appl. No.: 134,988

[30] Foreign Application Priority Data
Apr. 22, 1970  United Kingdom............... 19292/70

[52] U.S. Cl.................. 204/1 T; 204/195 R; 431/4; 252/462
[51] Int. Cl.² ...................... B01K 1/00; B01J 23/10
[58] Field of Search............ 204/1 T, 195 R, 195 P; 431/4

[56] References Cited
UNITED STATES PATENTS

| | | | |
|---|---|---|---|
| 3,595,809 | 7/1971 | Kehl..................................... | 252/462 |
| 3,644,147 | 2/1972 | Young........................... | 136/120 FC |
| 3,670,042 | 6/1972 | Croce et al...................... | 252/462 X |
| 3,703,548 | 11/1972 | Honda et al..................... | 252/465 X |
| 3,780,126 | 12/1973 | Manning......................... | 252/471 X |

*Primary Examiner*—W. J. Shine
*Attorney, Agent, or Firm*—Kemon, Palmer & Estabrook

[57] ABSTRACT

A catalyst material is described having the general formula:

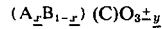

and which has a perovskite structure and the cations A, B and C are given certain limitations. The catalyst is particularly suited to use in relation to the induction of oxygen in alkaline solution and it has the ability to set up a reversible oxygen electrode potential over a wide range of temperature and oxygen partial pressures.

7 Claims, 5 Drawing Figures

METHOD OF MAKING CATALYST HAVING A PEROVSKITE STRUCTURE, THE RESULTING PRODUCT AND USES THEREOF

This invention relates to catalytic and other processes involving materials of perovskite structure. [W. H. Zachariasen, Skrift-Norske, Viden, Akad. Oslo, I. Nat. Naturv., Klasse 4, p. 1, 1928.]

In accordance with an aspect of the invention the catalyst used in a catalytic process or the like comprises one or more materials having a composition within the general formula:

$$(A_xB_{1-x})(C)O_3 \pm y$$

and which has a perovskite structure, the cations A and B having different valency states and occupying sites in common with the closely-packed oxygen anions, $x$ being between zero and unity but possibly equal to zero or unity, and C consisting of a transition metal cation or cations of variable valency. The cations A and B should have similar ionic radii and of course should have compatibility with the existence of the perovskite structure. The cations C will occupy the octahedral positions of the crystal lattice and the material(s) must exhibit ferro-magnetic exchange between octahedralsite cations of different valency. Cations C will be of metal(s) chosen from the first row of transition elements in the Periodic Table whose Atomic Numbers are 22 to 29 inclusive), most probably cobalt or nickel, but possibly from those of the second or third rows whose Atomic Numbers are respectivly 40 to 47 inclusive and 72 to 79 inclusive) which exhibit comparable d-electron characteristics. The structure is not necessarily stoichiometric but $y$ will most probably not exceed 0.5.

Cation A may be $Sr^{++}$ and cation B may be $La^{+++}$. Cation A may also be $Ba^{++}$ or $Ca^{++}$ whilst B may be any cation of rare earth elements whose Atomic Numbers are 57 to 71 inclusive).

The materials described have catalytic activity which may be demonstrated at least in relation to the reduction of oxygen in alkaline solution and its ability to set up a reversible oxygen electrode potential over a wide range of temperature and oxygen partial pressures. In addition the materials can exhibit high electronic conductivity which is extremely useful in certain applications. In the case of the material $La_{1-x}Sr_xCoO_3 \pm y$, the conductivity arises from the slight non-stoichiometry of the lattice causing the elevation of some $Co^{+++}$ to $Co^{++++}$ and the consequent electron transfer by superexchange via the intermediate oxygen anions. The concentration of $Co^{+++}$ may be changed by altering the number of $La^{+++}$ replaced by $Sr^{++}$ and it has been shown that up to 50 percent of the $La^{+++}$ sites can be replaced without breaking down the basic perovskite lattice.

Catalytic materials for use in accordance with the invention may be prepared, for example, by dissolving 8.5g $Sr(NO_3)_2$, 23.30g $Co(NO_3)_2.6H_2O$ and 17.81g $La(NO_3)_3.6H_2O$ in 500 ml. of distilled water and spraying in the form of a fine jet into liquid nitrogen at $-196°C$. Evacuation at $10^{-2}$Torr for 48 hours yields an homogeneous constituent which can then be decomposed at 250°C, followed by quenching in oxygen and heating to 500°C in air to form the perovskite phase. A surface area of $38M^2/g$ can be achieved with this material as measured by the B.E.T. technique. The resistivity of such powders is in the region of 0.1–1.0 ohm-cm at room temperature. Electrodes can then be prepared by mixing a dispersion of p.t.f.e. in water with the catalyst and evenly spreading the resultant paste on to a fine nickel mesh to give the desired catalyst loading. The electrodes are then dried and sintered at 300°C in air.

For example, 150 mg. perovskite catalyst, 85 mg. of 60 wt.% aqueous p.t.f.e. dispersion — Fluon GPI (the latter being a trade name and the material being obtainable from ICI Limited) and 500 mg. of distilled water, are mixed in an ultrasonic bath and brushed on to a 10 sq. cm. piece of 100 mesh screen, dried off in warm air and finally heated at 300°C for 1 hour. This quantity will give a catalyst loading of 10.12 $mg/cm^2$ and a catalyst/p.t.f.e. ratio of 3 : 1.

The electrodes may be tested in KOH solutions as a floating half-cell; a dynamic hydrogen electrode (D.H.E.) is used as the reference electrode. The D.H.E. is normally at least 50 mV more negative than the S.H.E. Gold is used as the counter electrode.

Tables 1 and 2 show the theoretical variations of open-circuit voltage (O.C.V.) of such electrodes, as functions of oxygen partial pressure at room temperature and at 180°C as well as the actual measured value.

TABLE 1

Variation of O.C.V. at room temperature with oxygen partial pressure ($P_{O_2}$)

| Pressure Atmos. P. | $\frac{RT}{nF}$ Log P (mV)$^c$ | Actual O.C.V. Measured (mV) | Observed v (mV) |
|---|---|---|---|
| 1 | 0 | 1275 | 0 |
| 0.21 | 10.3 | 1265 | 10 |
| 0.14 | 12.6 | 1263 | 12 |
| 0.05 | 19.1 | 1258 | 17 |

TABLE 2

Variation of O.C.V. at 180°C with oxygen partial pressure ($P_{O_2}$)

| Pressure Atmos. P. | $\frac{RT}{nF}$ (mV)$^c$ | Actual O.C.V. Measured (mV) | Observed v (mV) |
|---|---|---|---|
| 1 | 0 | 1280 | 0 |
| 0.21 | 15.6 | 1266 | 14 |
| 0.14 | 19.1 | 1260 | 20 |
| 0.05 | 29.1 | 1248 | 32 |

FIG. 1 shows a log.$P_{O_2}$ plot vs. open circuit voltage for determination at room temperature and at 180°C, both of which show straight line relationships. It seems that such electrodes are reversible and that the variation of open circuit potential (O.C.V.) with oxygen partial pressure is in accordance with the Nernst equation for a four-electron process.

FIG. 2 shows the change in open circuit voltage of the perovskite oxide electrode and that of a platinum electrode as functions of temperature up to 220°C in two electrolyte concentrations and confirms that in all cases the open-circuit voltage of the perovskite electrode is more than 100 mV above that of the platinum electrode. Moreover, after correction has been made to standard hydrogen electrode potential, the theoretical open circuit voltage is always achieved on the perovskite electrode.

Figure 1:
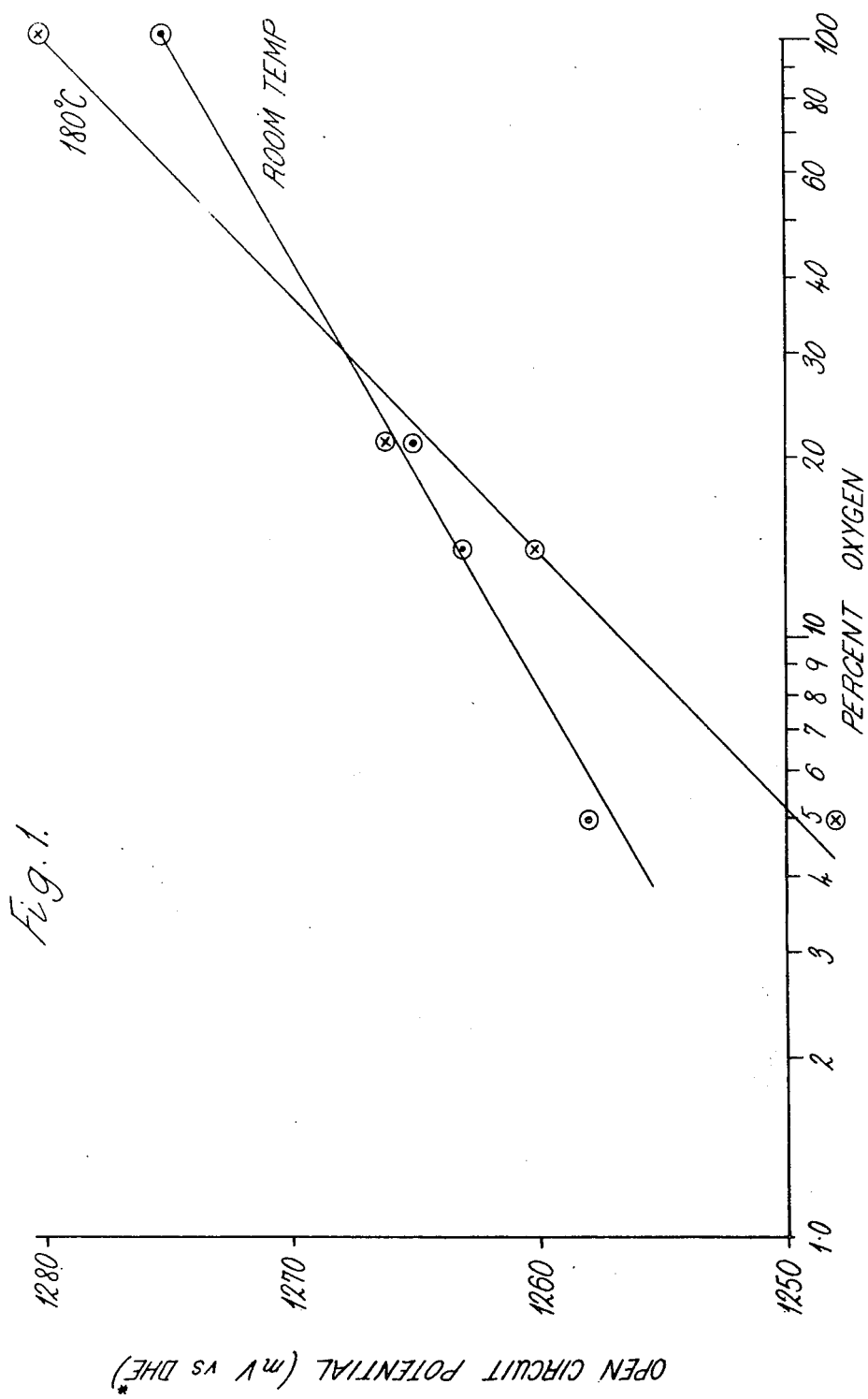
Figure 2:
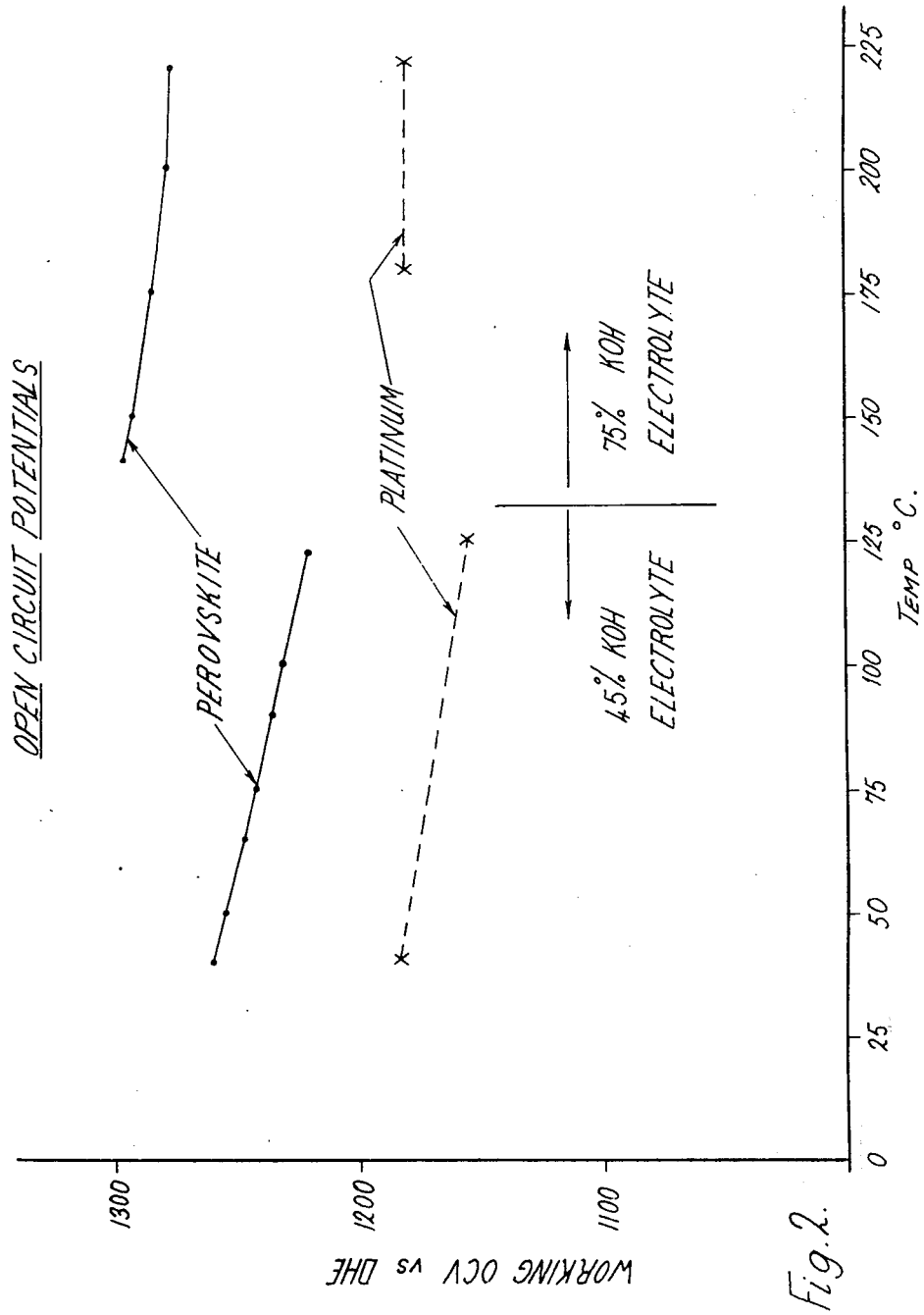
Figure 3:
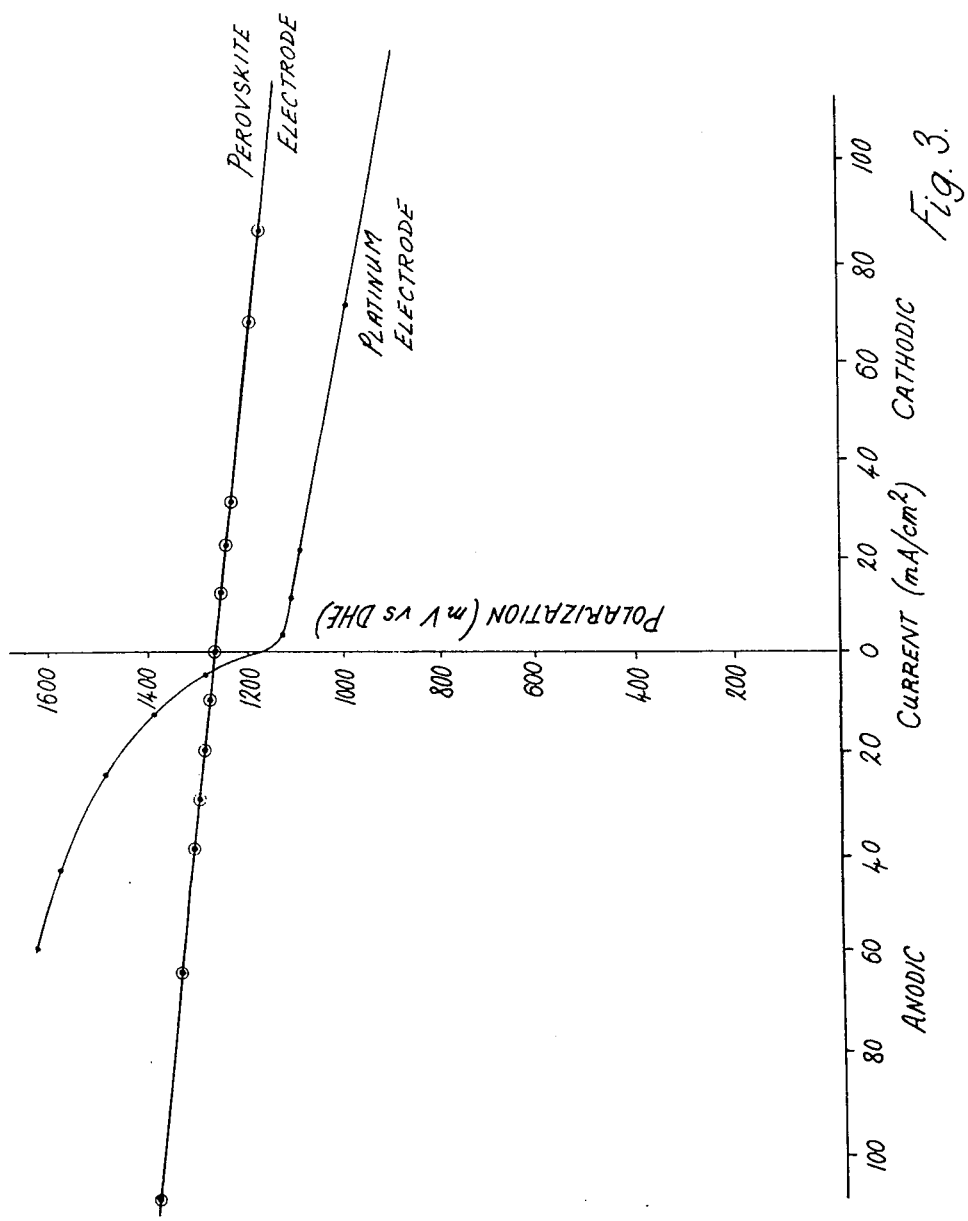
FIG. 3 shows the difference in performance of a perovskite electrode and a platinum electrode at 180°C for the oxygen reduction, and also oxygen evolution, reactions, again confirming that the perovskite electrode is far more active.
Figure 4:
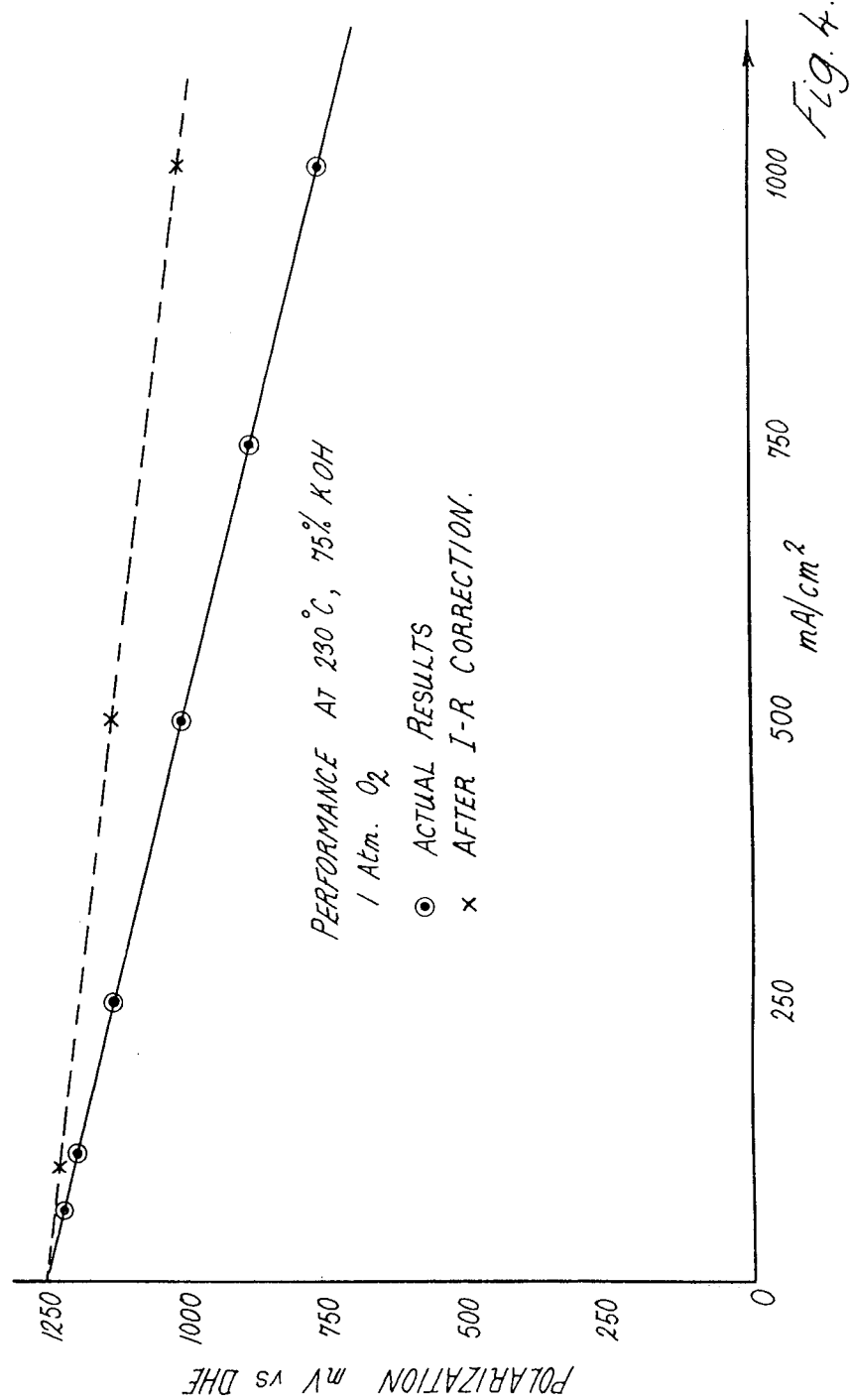
FIG. 4 shows the performance of the perovskite electrode for oxygen reduction at 230°C, confirming that it can give very high current with negligible polarisation.
Figure 5:
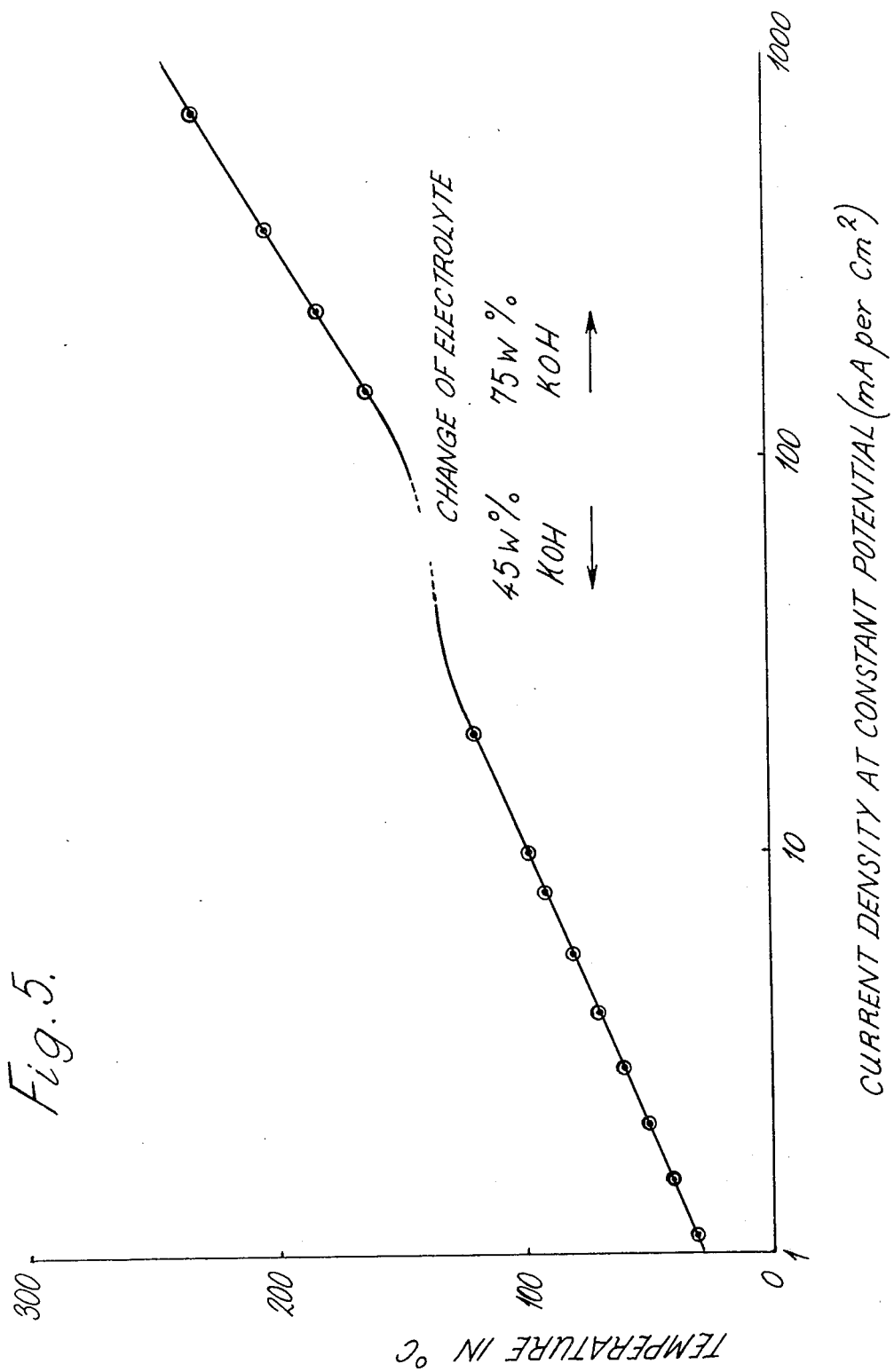
FIG. 5 shows the increase in performance with temperature from 25°C to 230°C. It should be noted that higher performances would be expected for electrodes with higher catalyst loadings.

It is probably of interest to venture a theoretical explanation of the surprisingly good performance of these materials as catalysts and such an explanation is now given; but it is emphasised that it is by no means certain that this is entirely correct. The electrochemical reduction of oxygen in alkaline solution:

$$2H_2O + O_2 + 4e \rightarrow 4OH^-$$

is generally regarded as a two-stage process:

(1) $O_2 + H_2O + 2e \rightarrow OH^- + HO_2^-$
(2) $HO_2^- + H_2O + 2e \rightarrow 3OH^-$ (slow)

Stage (2) is normally the rate-limiting step and significant improvement in performance and open circuit potential can be expected if the peroxide step can be eliminated. Isotopic work by Yeager et al (J. Electrochem. Soc. 106, 56 1959) has shown that the oxygen molecule in the $HO_2^-$ intermediate comes from the oxygen in the atmosphere. Thus, if the oxygen molecule is dissociatively chemisorbed, the $HO_2^-$ intermediate cannot be formed. Work by Tseung, Hobbs and Tantram (Electrochimica Acta, Feb. 1970) on the performance of nickel oxide and lithiated nickel oxide oxygen electrodes has shown that there is a close correlation between the magnetic properties of the oxide and the mode of oxygen chemisorption. For example, above the Neel point for NiO (approximately 220°C), NiO and lithiated NiO changes from antiferro-magnetic to paramagnetic, and the mechanism of oxygen chemisorption is dissociative as shown by Winter (J. Catal. 6, 35, 1966). This is because oxygen is paramagnetic, and unless the magneto-striction imposed by antiferro-magnetism in the NiO is destroyed, it cannot be chemisorbed "side-on": as O—O. This is one of the most important criteria for achieving the dissociative chemisorption of oxygen and other gases which are paramagnetic. The work quoted above has shown that lithiated NiO electrodes tested at 220°C in one atmosphere of oxygen in 75% KOH solution, gave reversible oxygen electrode potential and a performance higher than commercial cyanamid AB-1 electrodes. The main difficulty, however, has been the relatively high temperature of operation. Thus alternative materials which possess the appropriate magnetic properties at lower temperatures are of interest. It is as a result of this reasoning that a family of compounds (La, Sr) (Co, Ni) $O_3$ has been considered for catalytic and other use. In the presently proposed materials, the unique property of the doped oxide — such as Sr-doped La $CoO_3$ rests with the fact that trivalent cobalt in an octahedral perovskite interstice of $O^{--}$ anions exhibits a crystal field splitting approximately equal to the exchange energy (i.e. $\Delta \simeq 10Dq$). This means that second order effects (polarizability of ions, geometric factors etc.) will determine whether trivalent cobalt is in the high spin state (denoted as $Co^{+++}$ in this specification) with $U_{eff} \simeq 4\mu B$ per ion, or low spin state (denoted as $Co^{III}$) which is diamagnetic. Tetravalent cobalt is assumed to be in the low spin state (denoted $Co^{IV}$).

Detailed considerations of the magnetic interactions between the three types of cobalt ions has led to a number of suggested formulae for our Sr-doped compounds, the most likely being that in which the "cobalt lattice," may be separated into two chemically and electronically identical sublattices, each representing specifically spin-oriented Co ions, on a set of alternate (111) crystallographic planes:

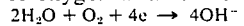
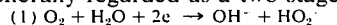

Alternate (111)

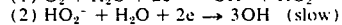

where ↑ denotes spin orientation and
$\alpha + \beta = 2y$

This is believed to be of profound significance in the chemisorption of oxygen because the existence of strong ferro-magnetic exchange between $Co^{+++}$ and $Co^{IV}$ satisfies an important condition for the rapid splitting of the O—O bond, according to the ideas developed from a study of the $Li_2O$-$NiO$-$O_2$ system.

The results given above appear to confirm that the O—O bond is broken during the chemisorption process on the materials proposed here.

The processes to which the invention may be applied can be divided into three:

a. Electrochemical
   i. Oxygen/air electrocatalysis in alkaline solutions, molten carbonate fuel cells and in solid oxide electrolyte cells;
   ii. Electrocatalysis in cells involving secondary air electrodes, since the oxygen evolution over voltage is low.
   iii. Since a reversible oxygen electrode potential is given, use can be made in an oxygen detector (the material being used as one of the electrodes) to monitor the oxygen partial pressure in a solution or in biomedical applications; the main advantage of this use being that it is only necessary to measure the voltage of the detector with a high impedance voltmeter and that during such operation practically no oxygen is consumed. This makes such use far superior to traditional polarographic methods or the use of metal/air cells to monitor oxygen tension, since the latter methods rely on the value of the limiting current. Use of micro-electrodes involving the proposed perovskite oxide catalysts as the oxygen electrode should be very suitable in biomedical applications, where normally no stirring of the solution is feasible.

b. Gas phase heterogeneous catalysis

Since the O—O bond is invariably broken during the chemisorption process on the surfaces of the proposed catalysts, it is expected that these catalysts should yield higher catalytic activity than most other catalysts presently used for oxidation reactions. Some specific examples are:

i. The oxidation of hydrocarbons. cf. The oxidation of ethylene to ethylene oxide or propylene to propylene oxide. At present $Ag_2O$ on support is normally used. The oxidation process requires the fissure of the O—O bond. In $Ag_2O$, it is accomplished by $Ag_2O \rightarrow 2Ag + O$, followed by the reoxidation of Ag.
   ii. The oxidation of $CO \rightarrow CO_2$. Possible use of this catalyst to reduce the CO level in motor car exhaust.
   iii. Since NO, an undesirable polluting gas from motor vehicles, is also paramagnetic, it is possible that it will be readily dissociatively chemisorbed, thus enabling the following reaction to proceed readily:

$CO + NO \rightarrow CO_2 + N_2$

This has important applications in reducing the level of pollutants from motor vehicle exhaust.

iv. For use in catalytic burners or additives in fuels such as heavy oil to increase the rate of combustion. This is possible since O atoms are expected to be more reactive than $O_2$ molecules.

c. Other applications

Since this class of material is corrosion resistant, and a corrosion scan in $N_2$ on the perovskite oxide electrode at 180°C 75% KOH demonstrates this, it is possible to use the perovskite oxide materials as coatings in, for example, protecting electrodes and current collectors and other components in electro-chemical systems. The fact that the materials are highly conducting is advantageous in that there should be negligible ohmic drop on, for instance, the electrodes and current collectors.

We claim:

1. In the polarographic method for determining the oxygen partial pressure in a solution, the improvement which comprises using as oxygen electrode material in the determination a perovskite structure catalyst having the composition represented by the formula:

$(A_x La_{1-x})(C)O_3$ wherein A is a cation selected from the group consisting of $Sr^{++}$, $Ba^{++}$ and $Ca^{++}$, C is a cation of cobalt or nickel, and x is a number greater than zero and less than one.

2. A catalytic oxidation process which comprises the combustion of liquid hydrocarbon fuels in the presence of a catalyst having a perovskite structure and a composition represented by the formula:

$(A_x La_{1-x})(C)O_3$ wherein A is a cation selected from the group consisting of $Sr^{++}$, $Ba^{++}$ and $Ca^{++}$, C is a cation of cobalt or nickel and X is a number between 0 and 1, inclusive.

3. A process for the production of a catalyst having a perovskite structure represented by the formula:

$(A_x La_{1-x})(C)O_3$ wherein A is a cation selected from the group consisting of $Sr^{++}$, $Ba^{++}$ and $Ca^{++}$, C is a cation of cobalt or nickel, and x is a number between 0 and 1, inclusive, which comprises:

forming an aqueous solution of salts of said cations in the amounts required to provide the proportions of cations as designated by said formula, spraying the aqueous solution in the form of a fine jet into liquid nitrogen to obtain small size particles, and subsequently decomposing said particles by heating.

4. The process of claim 3 wherein said small size particles are decomposed by heating to about 250°C, the resulting particles are then quenched in oxygen and finally heated in air to about 500°C.

5. The process of claim 3 wherein said aqueous solution of salts consists of a solution in water of strontium nitrate, cobaltous nitrate and lanthanum nitrate.

6. The process of claim 5 wherein material obtained from said step of spraying of said aqueous solution into liquid nitrogen is retained under high vacuum before decomposition by heating.

7. A catalyst having a perovskite structure and a composition represented by the formula:

$(A_x La_{1-x})(C)O_3$ wherein A is a cation selected from the group consisting of $Sr^{++}$, $Ba^{++}$ and $Ca^{++}$, C is a cation of cobalt or nickel and X is a number between 0 and 1, inclusive, which catalyst was made by the process defined in claim 3.

* * * * *